(12) United States Patent
Immendoerfer et al.

(10) Patent No.: US 10,174,669 B2
(45) Date of Patent: Jan. 8, 2019

(54) TURBOCHARGER INCLUDING AN ELECTRIC MACHINE

(71) Applicant: Robert Bosch GmbH, Stuttgart (DE)

(72) Inventors: Ingo Immendoerfer, Tamm (DE); Michael Baeuerle, Eberdingen (DE); Michael Nau, Dornhan/Aischfeld (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 15/315,502

(22) PCT Filed: May 27, 2015

(86) PCT No.: PCT/EP2015/061680
§ 371 (c)(1),
(2) Date: Dec. 1, 2016

(87) PCT Pub. No.: WO2015/185407
PCT Pub. Date: Dec. 10, 2015

(65) Prior Publication Data
US 2018/0142612 A1 May 24, 2018

(30) Foreign Application Priority Data
Jun. 3, 2014 (DE) .................. 10 2014 210 451

(51) Int. Cl.
*F02B 37/10* (2006.01)
*F04D 25/06* (2006.01)
(Continued)

(52) U.S. Cl.
CPC .............. *F02B 37/10* (2013.01); *F01D 15/10* (2013.01); *F02B 39/10* (2013.01); *F04D 25/024* (2013.01);
(Continued)

(58) Field of Classification Search
CPC ......... F02B 37/10; F02B 39/10; H02K 1/146; H02K 1/20; H02K 5/128; H02K 9/06;
(Continued)

(56) References Cited

U.S. PATENT DOCUMENTS 7,367,189 B2 * 5/2008 Ishiwatari ............... F02B 37/10
60/602
8,274,194 B2 * 9/2012 Gruendl ................. H02K 26/00
310/257
(Continued)

FOREIGN PATENT DOCUMENTS

CN 103498856 A 1/2014
DE 362179 C 10/1922
(Continued)

OTHER PUBLICATIONS

International Search Report dated Sep. 16, 2015, of the corresponding International Application PCT/EP2015/061680 filed May 27, 2015.

*Primary Examiner* — Hoang M Nguyen
(74) *Attorney, Agent, or Firm* — Norton Rose Fulbright US LLP; Gerard Messina

(57) ABSTRACT

A turbocharger for a motor vehicle, including a compressor, which has a compressor wheel situated on a rotatably supported shaft, an electric machine being situated in a pipe section of an axial compressor inlet, the electric machine including a rotor situated on the shaft and a stator situated on the pipe section. The stator has multiple webs projecting inward which are distributed over the circumference and extend at least essentially in an axial direction, the webs being used for forming flow channels which extend in an axial direction and are situated at a distance from one another.

6 Claims, 2 Drawing Sheets

(51) Int. Cl.
*H02K 5/128* (2006.01)
*F02B 39/10* (2006.01)
*H02K 1/14* (2006.01)
*H02K 1/20* (2006.01)
*F01D 15/10* (2006.01)
*F04D 25/02* (2006.01)
*H02K 7/14* (2006.01)
*H02K 9/06* (2006.01)

(52) U.S. Cl.
CPC ......... *F04D 25/0606* (2013.01); *H02K 1/146* (2013.01); *H02K 1/20* (2013.01); *H02K 5/128* (2013.01); *F05D 2220/40* (2013.01); *F05D 2220/76* (2013.01); *F05D 2250/51* (2013.01); *H02K 7/14* (2013.01); *H02K 9/06* (2013.01); *Y02T 10/144* (2013.01)

(58) Field of Classification Search
CPC ..... H02K 7/14; F04D 25/0606; F04D 25/024; F01D 15/10; Y02T 10/144; F05D 2220/76; F05D 2220/40; F05D 2250/51
USPC .............................................. 60/605.1, 605.2
See application file for complete search history.

(56) References Cited

U.S. PATENT DOCUMENTS

| | | | |
|---|---|---|---|
| 2005/0099086 A1* | 5/2005 | Schunk | H02K 1/146 310/216.069 |
| 2011/0025154 A1* | 2/2011 | Nussbaumer | H02K 1/2786 310/90.5 |
| 2011/0076166 A1 | 3/2011 | Godeke et al. | |
| 2012/0007453 A1* | 1/2012 | Leiber | H02K 1/18 310/43 |

FOREIGN PATENT DOCUMENTS

| | | |
|---|---|---|
| DE | 102013109136 A1 | 2/2014 |
| EP | 1338401 A1 | 8/2003 |
| EP | 1995426 A1 | 11/2008 |
| EP | 2072824 A2 | 6/2009 |
| GB | 2505454 A | 3/2014 |
| JP | 2002349277 A | 12/2002 |
| JP | 2005145397 A | 6/2005 |
| JP | 2005337126 A | 12/2005 |
| JP | 2007192110 A | 8/2007 |
| JP | 2011058401 A | 3/2011 |
| JP | 2013185547 A | 9/2013 |
| KR | 20060010221 A | 2/2006 |
| WO | 2004003359 A1 | 1/2004 |
| WO | 2011014934 A1 | 2/2011 |

* cited by examiner

TURBOCHARGER INCLUDING AN ELECTRIC MACHINE

FIELD

The present invention relates to a turbocharger, in particular for a motor vehicle, including a compressor, which has a compressor wheel situated on a rotatably supported shaft, an electric machine being situated in a pipe section of an axial compressor inlet, the electric machine having a rotor situated on the shaft and a stator situated on the pipe section.

BACKGROUND INFORMATION

A turbocharger is described in, for example, European Patent Application No. EP 1 995 426 A1. In this European patent, an electric motor is described which is integrated into a turbocharger, the electric motor being a so-called media gap motor, which forms a media passage opening between the rotor and the stator and is situated in the compressor inlet in such a way that the medium to be compressed is guided through the media gap between the rotor and the stator. This makes it possible for the turbocharger to have a particularly compact size. In particular, the achievement of this is that in the case of exhaust gas turbochargers, compared to approaches in which the electric motor is situated between the compressor and the turbine, no substantial change of the overall concept of the exhaust gas turbocharger is required for integrating the electric motor.

One disadvantage of the above-named approach is that due to the large air gap between the rotor and the stator, very strong permanent magnets must be provided on the rotor in order to be able to deliver the required torque characteristic of the electric machine. Conventionally, this results in a requirement for high currents and consequently a low efficiency of the electric machine.

SUMMARY

An example turbocharger according to the present invention may have the advantage that the effective air gap between the rotor and the stator is reduced, making it also possible to design the necessary stator magnetomotive force to be smaller or weaker, thereby significantly increasing the efficiency of the electric machine. The inward facing or projecting webs optimize the magnetic flux, the medium to be compressed continuing to be guided between the webs with only slight flow losses. Simultaneously, the stator is also cooled extremely well during operation by the webs, around which medium flows. According to the present invention, it is provided for that purpose that the stator has multiple webs projecting inward which are distributed over the circumference and extend at least substantially in an axial direction, the webs being used for forming flow channels which extend at least essentially in an axial direction and are situated at a distance from one another. Consequently, the flow channels are created between the webs, the channels being used for guiding and conducting the medium to be compressed. The flow channels are in particular designed to be open at the edges in the direction of the rotor. The number and design of the webs results from a flow-optimized design and a magnetic flux-optimized design. It is provided in particular that a plurality of webs are provided, which have a relatively large radial distance to the rotor, at least corresponding to the radial extension of the webs, or few webs are provided which, however, are brought close to the rotor.

According to an advantageous refinement of the present invention, it is provided that the webs are situated uniformly distributed over the circumference of the pipe section. This results in a further optimization of the magnetic flux during operation.

It is further preferably provided that the webs are made from a ferromagnetic material. For example, the webs may be made from electrical steel sheets. As a result, the stator magnetic field conducts approximately 3000 times better than air. Compared to conventional approaches, permanent magnets assigned to the rotor may as a result be designed to be smaller or less strong while the power of the electric motor or electric machine remains constant.

According to a preferred refinement of the present invention, it is provided that the stator is designed to be without windings in the area of the webs. Thus, the space formed between the webs is completely available for the medium to flow through. As a result, the stator is optimally cooled and the flow of medium is minimally affected.

Furthermore, it is preferably provided that the stator is provided with at least one winding in the area of the webs which only partially fills the particular flow channel. Thus, if a winding is also assigned to the stator in the area of the webs, the winding only partially fills the particular flow channel between adjacent webs, so that an adequate flow cross section is constantly kept open or made available for the medium to be compressed. The winding located between the webs is then also cooled by the flow of medium, further improving the efficiency of the electric machine or the turbocharger.

Preferably, the webs have a flow-optimized, in particular drop-shaped profile. In particular, the drop profile is formed in the axial extension, so that the webs impair the flow of medium as little as possible.

According to an advantageous refinement of the present invention, it is provided that the turbocharger is designed as an exhaust gas turbocharger and has for that purpose a turbine including a rotatably supported turbine wheel, which is operatively connected with the compressor wheel by the shaft. Exhaust gas turbochargers are known in principle. As a result of the advantageous design of the turbocharger described here, the electric motor is integrated without the necessity of carrying out great changes in the exhaust gas turbocharger, the design according to the present invention ensuring a high efficiency of the exhaust gas turbocharger, in particular the electric machine. According to a first specific embodiment, the turbine and the compressor wheel are non-rotatably connected to one another, so that operation of the electric machine also drives the turbine. Accordingly, the turbine may also drive the electric machine, for example, as a generator, in order to generate electrical energy.

According to a particularly preferred refinement of the present invention, it is provided that the compressor wheel and the turbine wheel are connected to one another by a freewheel clutch, which allows the compressor wheel to overtake the turbine wheel. In this case, it thus provided that the turbine wheel and the compressor wheel are not connected to one another non-rotatably in one direction of rotation. In particular, the freewheel clutch makes it possible for the compressor wheel to be driven by the electric machine independently of the turbine wheel. This reduces the load acting on the electric machine during electric drive. In particular, the freewheel clutch reduces the inertia load by approximately two-thirds, since only the compressor wheel must be accelerated, which is generally substantially lighter, but not the heavy or inert turbine wheel. This results in improved dynamic response of the exhaust gas turbocharger compared to conventional approaches.

The present invention is explained in greater detail below with reference to the figures.

DETAILED DESCRIPTION OF EXAMPLE EMBODIMENTS

Figure 1:
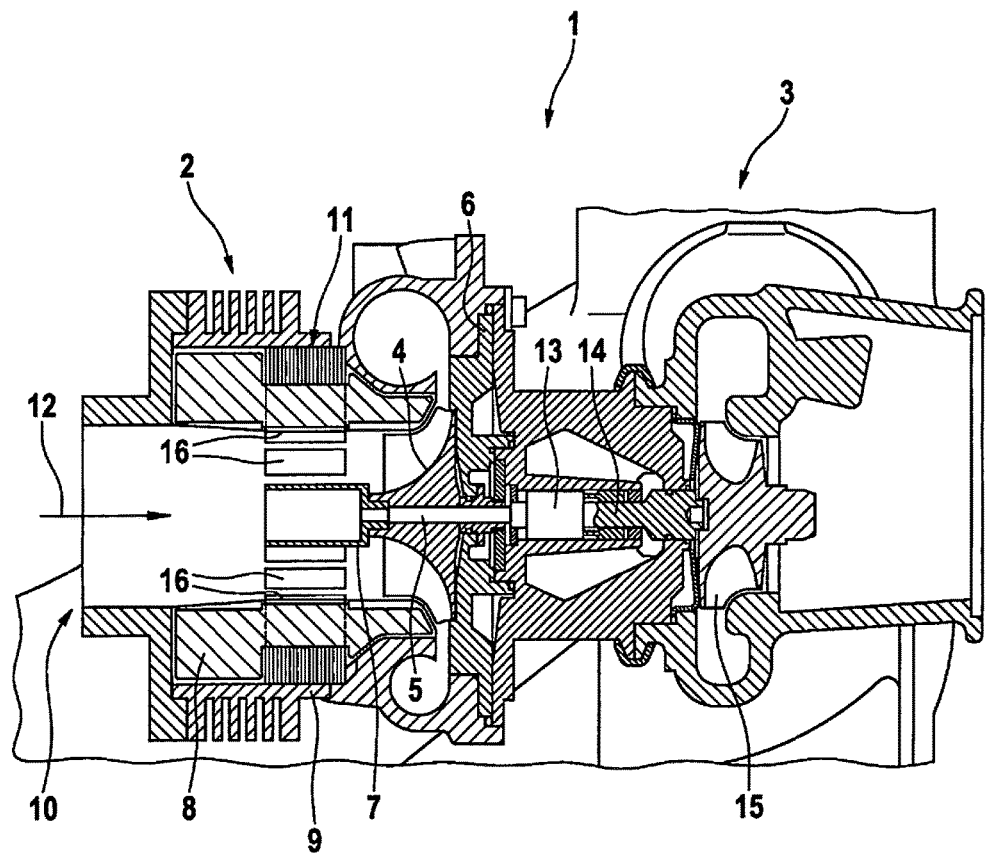
FIG. 1 shows a longitudinal sectional representation of an exhaust gas turbocharger.

In a simplified longitudinal sectional representation, FIG. 1 shows an exhaust gas turbocharger 1, which includes a compressor 2 and a turbine 3, which are operatively connected to one another. Compressor 2 includes a compressor wheel 4, which is non-rotatably situated on a shaft 5. Shaft 5 is rotatably supported in a multi-piece housing 6 of exhaust gas turbocharger 1. On the free shaft end of shaft 5 which is assigned to compressor wheel 5 a rotor 7 is situated which carries one or multiple permanent magnets (not shown here individually). A stator 8, which is situated on a pipe section 9, which forms a compressor inlet 10, is assigned to the rotor. Rotor 7 and stator 8 together form an electric machine 11, which is situated in pipe section 9 or in valve inlet 10, and in particular is used for driving shaft 5 and consequently for driving compressor wheel 4. Electric machine 11 is designed as a media gap machine, which is characterized in that an annular flow gap for the medium to be compressed exists between rotor 9 and stator 8. The internal diameter of stator 8 is consequently greater than the external diameter of rotor 7. The medium to be compressed, which flows in through compressor inlet 10 according to arrow 12, thus flows through electric machine 11 to compressor wheel 4.

On the side of compressor wheel 4 diametrically opposed to rotor 7, shaft 5 is coupled to a turbine shaft 14 which carries a turbine wheel 15 of turbine 3 with the aid of a freewheel clutch 13, which is shown only in a simplified manner. Overrunning clutch 13 is designed in such a way that it allows compressor wheel 4 to be driven by electric machine 11 independently of turbine wheel 15. Freewheel clutch 13 consequently makes it possible for compressor wheel 4 to overtake turbine wheel 15 or to be operated at a higher speed than turbine wheel 15. If compressor wheel 4 runs out or is driven by the electric machine, its movement is decoupled from that of turbine wheel 15, as a result of which the moment of inertia of turbine wheel 15 is also decoupled and as a result, a significantly increased angular acceleration of electric machine 11 is achievable.

On stator 8, electric machine 11 has multiple webs 16, which are situated uniformly distributed over the circumference of stator 8 and which extend axially on the stator inner side or radially inward, in relation to the axial extension of shaft 5. Between adjacent webs 16, free spaces are consequently formed which represent flow channels 17, which also extend axially, corresponding to the axial extension of the webs.

Figure 2:
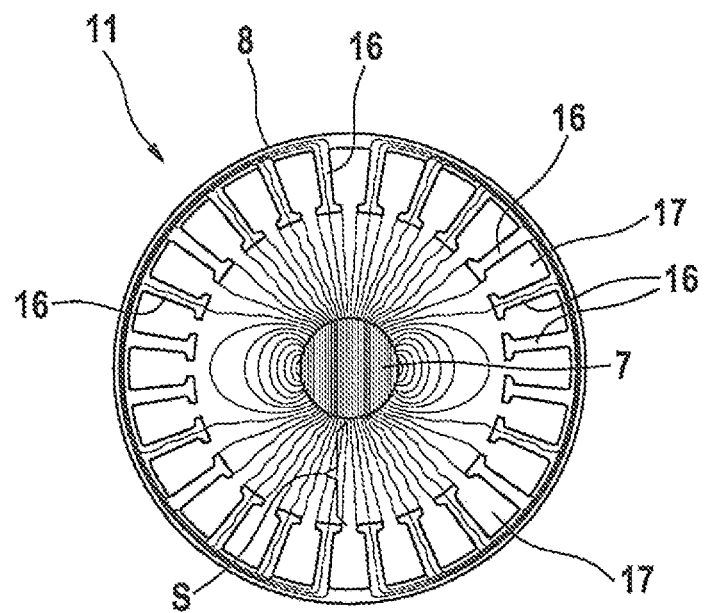
FIG. 2 shows a first exemplary embodiment in a cross sectional representation.

FIG. 2 shows a first exemplary embodiment of electric machine 11 of exhaust gas turbocharger 1 in a cross-sectional representation through rotor 7 and stator 8, including plotted magnetic field characteristics. According to this exemplary embodiment, a plurality of webs 16 is provided, of which only several are provided with reference numerals for the sake of clarity. Between each two adjacent webs 16, one of the already mentioned flow channels 17 is formed. Webs 16 terminate radially at a distance from rotor 7, resulting in a gap S between rotor 7 and stator 8, through which the medium to be compressed may flow, in addition to flow channels 17, the edges of which are open toward rotor 7.

Figure 3:
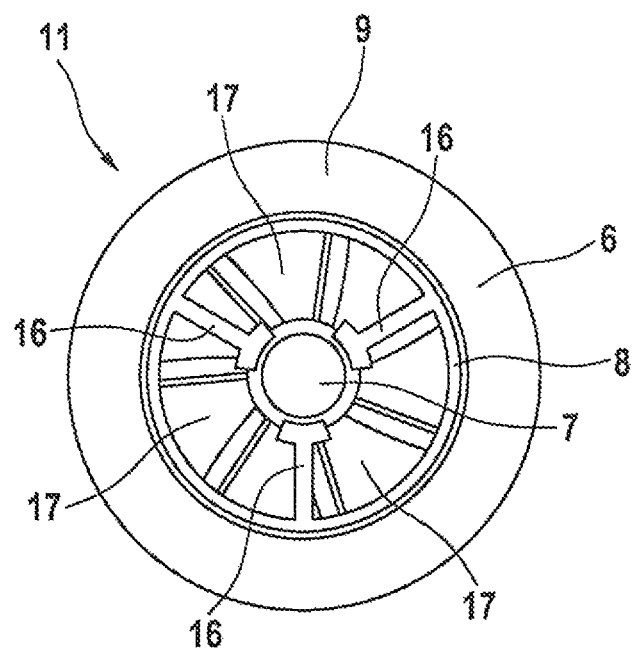
FIG. 3 shows a second exemplary embodiment of the exhaust gas turbine in a cross sectional representation.

FIG. 3 shows a second exemplary embodiment of electric machine 11, likewise in a cross-sectional representation, which differs from the preceding exemplary embodiment in that the number of webs 16 is selected to be much smaller, remaining webs 16 having a much smaller radial distance or gap toward rotor 7. Consequently, webs 16 project radially further inward in the direction of rotor 7 into pipe section 9. The two exemplary embodiments have in common that the free flow cross section is the same for the medium to be compressed, in particular fresh air.

Exhaust gas turbocharger 1 presented here has the advantage that a lower current consumption is required for operating electric machine 11 at consistent power compared to known approaches. Due to the integration of webs 16 or stator teeth, made in particular from ferromagnetic material such as, for example, electrical steel sheets, the stator magnetic field is guided much better than previously. The intake air of compressor 2 flows between webs 16, if necessary including exhaust gas components, due to exhaust gas recirculation, as a result of which stator 8 is also cooled very well. In order to reduce the flow losses and, if necessary, to improve the compressor pump behavior, the webs are preferably aerodynamically profiled and are in particular provided with a drop shape. Preferably, webs 16 are also optimized with respect to their iron cross section (ratio of iron cross section to air cross section). Webs 16 reduce the effective air gap between rotor 7 and stator 8, as a result of which the permanent magnet or magnets on rotor 7 and the required stator electromotive force are diminished or reduced, which increases the efficiency of electric machine 11. Freewheel clutch 13 relieves electric machine 11, since the latter only has to drive comparatively lighter compressor wheel 4, but not the heavy, and therefore more inert, turbine wheel 15. Using the particularly limited energy of a vehicle electrical system of a motor vehicle provided with the corresponding exhaust gas turbocharger, a considerably improved dynamic response of electrically operable exhaust gas turbocharger 1 is achieved.

Using magnetic equipment/power, which is identical in comparison to known approaches, the proposed approach increases the magnetic flux in the air gap by approximately 30% to approximately 300% as a function of geometry. In the case of a power-equivalent electric machine 11, less magnetomotive force is then required by the same factor, i.e., the required number of windings, motor length and/or current intensity decrease according to the electromagnetic design. This also increases efficiency and machine utilization (power to motor volume).

The shape of webs 16, in particular as viewed in cross section, may now be implemented three-dimensionally using layered electrical steel sheets, in particular in order to be aerodynamically optimized or to cause only small flow losses in the air to be compressed. As a result of aerodynamically shaped webs 16, the so-called pneumatic pumping limit of compressor 2 is shifted toward smaller air flows at higher pressures, as a result of which compressor 2 becomes more powerful and also makes higher work points possible without space-consuming geometric changes. The medium to be compressed or the air flows through the gap of electric machine 11 and thus cools both the rotor and the stator. Radially inward projecting or protruding webs 16 or stator teeth also act as heat sinks for stator 8 so that a heat loss of stator 8 may be dissipated even better to the air to be compressed.

Furthermore, it is also possible to provide a stator winding in the area of webs 16 which, however, only partially fills flow channels 17, so that a continued flow through electric machine 11 is ensured using a preferably large flow cross section. By providing one or multiple windings in the area of webs 16, these are also cooled and the behavior of electric machine 11 is further optimized. Furthermore, the magnetic leakage is reduced, since electrical and permanently excited magnetomotive forces are spatially closer together, and a smaller component of the magnetomotive forces is not coupled to rotor 7 and stator 8.

Overall, exhaust gas turbocharger 1 is thus comparable to an exhaust gas turbocharger which has an additional electrically drivable supplemental compressor. As a result of the described design, a comparable dynamic of the compressor stage is achieved, the integration of electric machine 11 into compressor 2 making it possible to also use components of exhaust gas turbocharger 1, which are present, in particular with respect to mounting, housing, tubing and cooling. An electronics system necessary for electric machine 11 may be attached to housing 6 of exhaust gas turbocharger 1 flexibly or in a simple manner, in particular by flange-mounting, or it may be situated in the vicinity of it, so as not to produce an excessively large individual component.

Exhaust gas turbocharger 1 is in particular suitable for use in a motor vehicle which has an internal combustion engine as a drive device.

What is claimed is:

1. A turbocharger for a motor vehicle, comprising:
a compressor which includes a compressor wheel situated on a rotatably supported shaft, an electric machine situated in a pipe section of an axial compressor inlet, the electric machine including a rotor situated on the shaft, and a stator situated on the pipe section;
wherein the stator has multiple webs projecting inward which are distributed over a circumference of the stator and extend in an axial direction, the webs being used for forming flow channels which extend in an axial direction and are situated at a distance from one another; and
wherein the webs are part of a stator core of the stator and are partially wound by windings, and wherein each of the webs has an aerodynamic, flow-optimized, drop-shaped profile formed in an axial extension.

2. The turbocharger as recited in claim 1, wherein the webs are situated uniformly distributed over the circumference.

3. The turbocharger as recited in claim 1, wherein at least the webs of the stator are made from a ferromagnetic material.

4. The turbocharger as recited in claim 1, wherein the stator is provided with at least one winding in the area of the webs which only partially fills the flow channel.

5. The turbocharger as recited in claim 1, wherein the turbocharger is an exhaust gas turbocharger and has a turbine including a rotatably supported turbine wheel, which is operatively connected to the compressor wheel by the shaft.

6. The turbocharger as recited in claim 5, wherein the compressor wheel and the turbine wheel are connected to one another operatively by a freewheel clutch which allows the compressor wheel to overtake the turbine wheel.

\* \* \* \* \*